(12) United States Patent
Iiduka

(10) Patent No.: US 6,787,714 B2
(45) Date of Patent: Sep. 7, 2004

(54) ELECTRONIC BALANCE

(75) Inventor: Atushi Iiduka, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 75 days.

(21) Appl. No.: 10/207,724

(22) Filed: Jul. 29, 2002

(65) Prior Publication Data

US 2003/0042052 A1 Mar. 6, 2003

(30) Foreign Application Priority Data

Aug. 29, 2001 (JP) ........................................ 2001-259159

(51) Int. Cl.$^7$ ................................................ G01G 1/00
(52) U.S. Cl. ..................... 177/212; 177/229; 73/862.63; 73/8
(58) Field of Search ................. 177/210 EM, 212, 177/229; 73/862.638, 862.639

(56) References Cited

U.S. PATENT DOCUMENTS

| | | | | |
|---|---|---|---|---|
| 3,927,560 A | | 12/1975 | Farr | 73/862.633 |
| 4,128,001 A | * | 12/1978 | Marks | 73/1.15 |
| 4,196,784 A | | 4/1980 | Suzuki et al. | 177/21 |
| 4,208,905 A | | 6/1980 | Spoor | 73/862.633 |
| 4,338,825 A | * | 7/1982 | Amlani et al. | 73/862.382 |
| 4,655,306 A | * | 4/1987 | Saner | 177/229 |
| 4,798,251 A | * | 1/1989 | Maaz et al. | 177/229 |
| 4,799,561 A | * | 1/1989 | Komoto | 177/229 |
| 5,183,125 A | * | 2/1993 | Schurr | 177/211 |
| 5,205,369 A | * | 4/1993 | Neeleman | 177/229 |
| 5,220,971 A | * | 6/1993 | Farr | 177/229 |
| 5,250,762 A | * | 10/1993 | Gustafsson et al. | 177/244 |
| 6,472,618 B1 | * | 10/2002 | Izumo et al. | 177/210 EM |
| 6,555,767 B1 | * | 4/2003 | Lockery et al. | 177/211 |
| 6,563,060 B2 | * | 5/2003 | Komoto | 177/210 EM |

FOREIGN PATENT DOCUMENTS

| | | |
|---|---|---|
| EP | 0 291 258 A2 | 11/1988 |
| JP | 6-29761 | 4/1994 |

* cited by examiner

Primary Examiner—Randy W. Gibson
(74) Attorney, Agent, or Firm—Rankin, Hill, Porter & Clark LLP

(57) ABSTRACT

Protruding part of a mechanism body is connected to a base frame by screws, and other protruding part is connected to an auxiliary connecting metal fittings by the screws. A machining necessary for connecting is conducted on the protruding portions, the widths of which are wide. Therefore, a sufficiently long distance can be obtained by the protruding portions. As a result, the Roberval's parts 4, 5 are not affected by stress strain, which is caused in the process of connecting, even if a size of an electronic balance in a longitudinal direction is not extended. Accordingly, it is possible to realize the compact electronic balance of high performance in which an accurate measurement can be made even if a load is given to a balance pan being biased.

15 Claims, 3 Drawing Sheets

ELECTRONIC BALANCE

BACKGROUND OF THE INVENTION

1. Field of the Invention

The present invention relates to an electronic balance for measuring a weight of an article including a Roberval's mechanism for keeping a balance pan in horizontal and a lever mechanism as a lever for transmitting a displacement of a height of a balance pan to a load sensor, which are integrated into one body by hollowing out a base material of the electronic balance.

2. Description of the Related Art

JP-B-6-29761 disclosed an example of an electronic balance of the related art. In a related art, an aluminum alloy body like a parallelepiped is hollowed out from a side thereof so that the aluminum alloy body is formed into a predetermined shape. In this way, a mechanism body of the electronic balance including a detecting part has an integral structure in which the hollowed aluminum alloy body and elastic parts are integrally formed into one body. The structure is shown in FIGS. 5 and 6. A mechanism body 1 is fixed to a base frame 2 by screws 3. Sheet-shaped Roberval's parts 4, 5 are respectively formed in an upper and a lower end portion of the mechanism body 1. A lever 6 elastically supported by a contracted part 6a, which becomes a fulcrum, is formed below the Roberval's part 4. A force coil 7 is fixed to an end portion of the lever 6. The other end portion of the lever 6 is connected to a movable part 10 by a connecting part 9. The contracted parts are formed at both ends of the connecting part 9.

A receiving rod 11 is fastened to an upper end portion of the movable part 10. A balance pan 12 for measurement is fixed to the receiving rod 11. A periphery of the force coil 7 is hollowed out. A magnet 8 is fixed to the hollowed portion of the force coil 7. Although not shown in the drawing, at the end portion of the lever 6 corresponding to the force coil 7, there is provided a zero position sensor for detecting the displacement using a photo sensor. In this type electronic balance, a control circuit is provided except for the aforementioned components. (not shown)

In measuring a weight, an object to be measured is put on the balance pan 12. When the weight of the object is given, the movable part 10 is displaced downward while the balance pan 12 keeping in horizontal position because the upper and the lower face of the movable part 10 are supported by the Roberval's parts 4, 5. This downward displacement of the movable part 10 is transmitted to an end portion of the lever 6 by the connecting part 9, and then the end portion of the lever 6 on the force coil 7 side is displaced upward as a fulcrum of the contracted part 6a.

This displacement of the end portion of the lever 6 is detected by the zero position sensor. An electronic current flows in the force coil 7 by the control circuit so that the above displacement can become zero by an attraction force generated by the force coil 7 and the magnet 8. Accordingly, the electronic current proportional to the load of the object put on the balance pan 12, flows in the force coil 7. At this time, an intensity of the electronic current flowing in the force coil 7 is converted into a weight and displayed on a display part, which is not shown in the drawing.

The electronic balance is composed as described above. Therefore, it is necessary to conduct machining such as screw thread cutting for connecting the base frame 2 to the mechanism body 1. It is also necessary to fasten the receiving rod 11 to the mechanism body 1. When the screws 3 are fastened, as shown in FIG. 6, stress strain parts 3a, 11a are generated in the periphery of a screw thread cutting part 14 of the mechanism body 1. By an influence of this stress strain given to the stress strain parts 3a, 11a, an error is caused when the object to be measured is biased and put on the balance pan 12.

In order to solve the problem of the above error caused when the object to be measured is put on the balance pan being biased, a distance from the Roberval's parts, 4, 5 to the screw thread cutting part 14 may be sufficiently long so that the measurement cannot be affected by the screw thread cutting part 14.

In order to avoid the influence of the measurement error caused by the stress strain, there is provided another method in which a slit is between the Roberval's parts 4, 5 and the screw thread cutting part 14.

However, when this method is adopted, the mechanism body 1 is extended in a longitudinal direction.
(Hereinafter, the longitudinal direction is defined as a direction from the receiving rod 11 to a joining portion, at which the mechanism body 1 is connected to the base frame 2). Further, it is necessary to optimize a shape of the slit and a position at which the slit is formed. Therefore, it is necessary to apply a complicated technique.

Accordingly, in any of the above methods, the mechanism body 1 is extended in the longitudinal direction. In general, in the case of an electronic balance, the balance pan using for measurement is set at the center of the balance. Therefore, when a size only in one direction is extended, it becomes difficult to downsize the electronic balance. The present invention has been accomplished in view of the above problems.

SUMMARY OF THE INVENTION

It is an object of the present invention to provide an electronic balance being capable of solving a measurement error, which is caused by stress strain in a joining portion of the electronic balance, without extending the size of the electronic balance in a longitudinal direction when an object to be measured is put being biased.
(Hereinafter, the longitudinal direction is defined as a direction from a receiving rod to a joining portion, at which a mechanism body is connected to a base frame.)

In order to solve the above problem, an electronic balance comprising:

a balance pan for putting an article thereon;

a movable part fixed to the balance pan; and a Roberval's mechanism for moving the movable part in parallel in the vertical direction, wherein the movable part, Roberval's mechanism, and each connecting part of the movable part and Roberval's mechanism are formed into an integral construction, a lever mechanism for transmitting a displacement of the movable part to a load sensor;

a display device for displaying a weight of the article detected by the load sensor;

a base frame for fixing the integral construction; and a protruding portion formed at least in a joining portion where the integral construction is fixed to the base frame and in an attached portion where the balance pan is attached in the integral construction, a width of the protruding portion being larger than that of the Roberval's mechanism, wherein at least one of the balance pan and the base frame is joined at the protruding portion.

From a first aspect of the invention, a distance from the joining portion to the Roberval's mechanism can be made sufficiently long. The electronic balance of the invention has a structure in such a manner that the Roberval's mechanism is not affected by stress strain, which is caused when the screw is fastened, without extending the size of the electronic balance in the longitudinal direction.

As a result, it becomes possible to solve the problem of an error caused when an object to be measured is put being biased. It also becomes possible to reduce the size of the electronic balance in the longitudinal direction. Therefore, a compact electronic balance can be put into practical use.

DETAILED DESCRIPTION OF PREFERRED EMBODIMENTS

Figure 1:
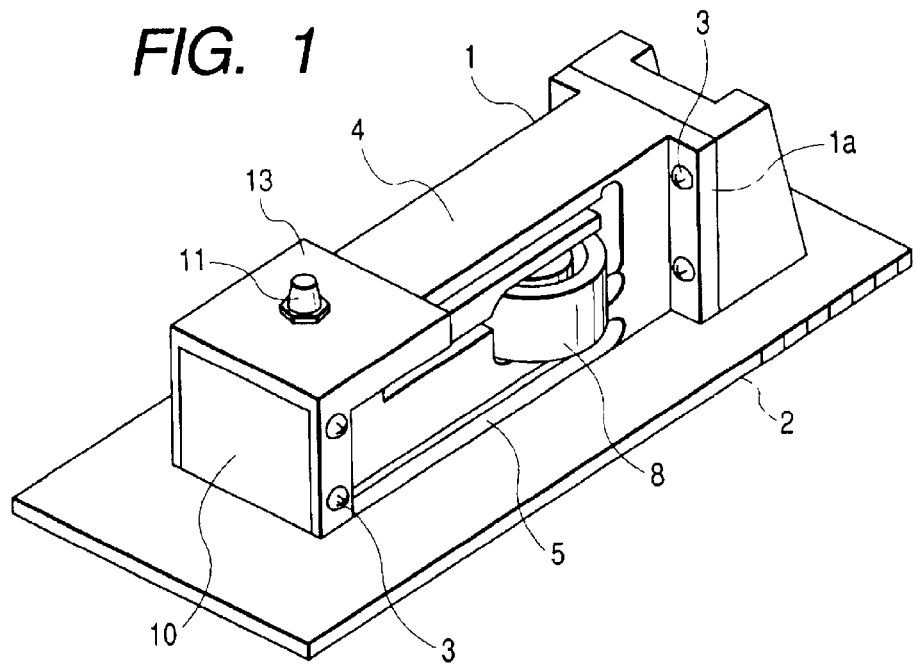
FIG. 1 is a perspective view showing an appearance of a primary portion of an electronic balance of the present invention.

Referring to embodiments shown in the drawings, a present invention will be explained as follows.

Figure 2:
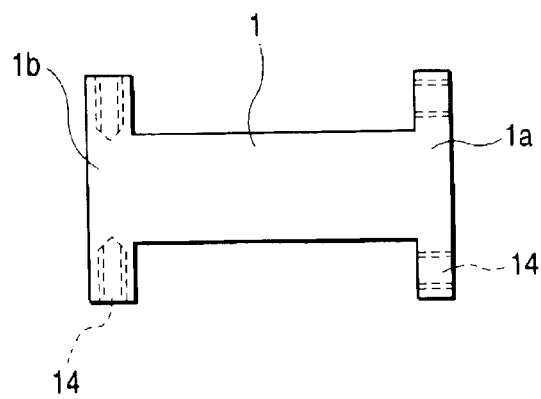
FIG. 2 is a plan view showing a mechanism part of an electronic balance of the present invention.

A mechanism body 1 of an electronic balance of the present invention is shown in FIGS. 1 and 2. As shown in FIG. 2, protruding portions 1a, 1b, which are wide in width, are formed in the mechanism body 1. The mechanism body 1 and the base frame 2 are attached to each other. A movable part 10 and a receiving rod 11 are also attached to each other via the protruding portions 1a, 1b. In the protruding portions 1a, 1b, there is provided a screw thread cutting part 14, which is screwed for connecting. FIG. 1 is a perspective view showing a state in which the screws are attached.

By the protruding portions 1a, 1b, a distance from the screw thread cutting part 14 to the Roberval's parts 4, 5 can be made sufficiently long without extending a size of the electronic balance in a longitudinal direction.
(Hereinafter, the longitudinal direction is defined as a direction from the receiving rod 11 to a joining portion, at which the mechanism body 1 is connected to the base frame 2). Therefore, the Roberval's parts 4, 5 are not affected by stress strain generated in a machining portion. Since machining is conducted on the protruding portions 1a, 1b, the size of the electronic balance is transversely increased. However, even if the size in the longitudinal direction is reduced as compared with the conventional structure, the measurement is not affected by the stress strain caused in the screw thread cutting portion 14. Therefore, it becomes possible to put a compact electronic balance of high performance into practical use.

FIG. 1 is a perspective view showing an appearance of a primary portion of the electronic balance.

Figure 4:
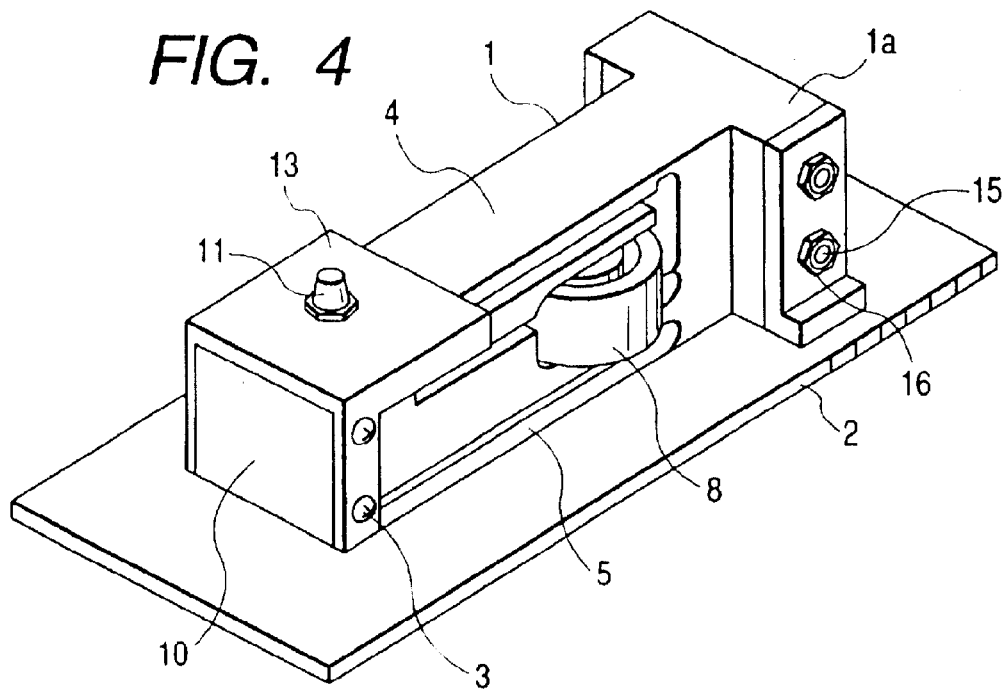
FIG. 4 is a perspective view showing a variation of a mechanism part of an electronic balance of the present invention.
Figure 5:
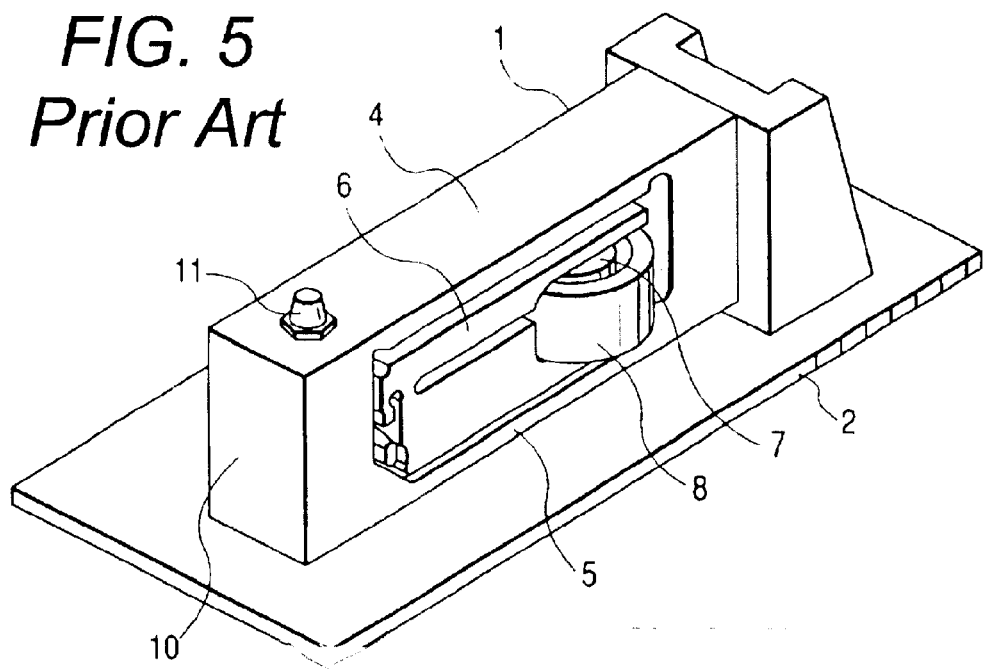
FIG. 5 is a perspective view showing a mechanism body part of a electronic balance of the related art.
Figure 6:
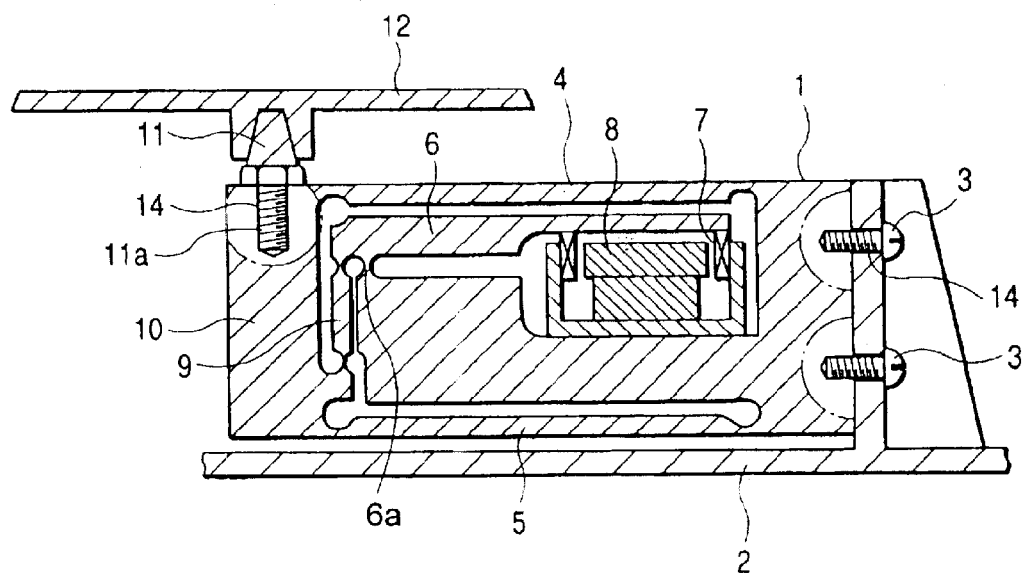
FIG. 6 is a partial view for explaining a electronic balance of the related art.

Reference numbers are used for same constructions in FIG. 1 as well as FIG. 4. In the present invention, auxiliary connecting metallic fittings 13 are arranged between the movable part 10 and the receiving rod 11. That is, the auxiliary connecting metallic fittings 13 are fixed to the protruding portion 1b by the screws 3. The protruding portion 1b is formed so that the width of the side of the movable part 10 is extended transversely. The receiving rod 11 is fixed to an upper portion of the auxiliary connecting metallic fittings 13. On the other hand, the protruding portion 1a of the mechanism body us fixed to the base frame 2 by the screws 3.

Since the electronic balance of the present invention is constructed as described above, a load to be measured is transmitted to the movable part 10 by the receiving rod 11 via the auxiliary connecting metallic fittings 13. Measuring operation is the same as that of the electronic balance of the related art. Therefore, the detailed explanations are omitted here.

The electronic balance provided by the present invention is characterized by the shape of the mechanism body 1 as the details are described above. However, the present invention is not limited to the above specific embodiments shown in the drawings. It is possible to adopt a structure in which at least one of the protruding portions 1a, 1b, is arranged. The present invention includes various constructions.

Figure 3:
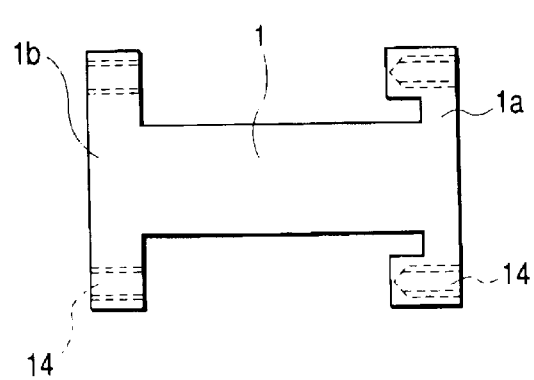
FIG. 3 is a plan view showing a variation of a mechanism part of an electronic balance of the present invention.

FIG. 3 is a view showing an embodiment of the mechanism body 1 of the present invention. In the embodiment, the structure of the protruding portion 1a is changed. As shown in FIG. 3, when both end portions of the protruding portion 1a are extended in the longitudinal direction, the rigidity of the mechanism body 1 can be enhanced. The screw thread cutting portion 14 of the wide width portion 1b relating to the attaching part of the auxiliary connecting metallic fittings 13 can be machined in any direction. FIG. 4 is a view showing still another embodiment. In this embodiment, screw thread cutting is not conducted on the protruding portion 1a, but through-holes are formed in the protruding portion 1a, and then the bolts 15 having screws at both end portions are held by the base frame 2 with the nuts 16.

The connecting method is not limited to joining by screw. It is also possible to join by adhesion or welding. In the embodiment, the electromagnetic load sensor is used, however, the load sensor is not limited to the electromagnetic type load sensor. It may use various types of load sensors. In the embodiment, the sensor is arranged inside the integral construction, however, the position at which the sensor is arranged may be an end portion of the integral construction and any other positions.

It should be noted that the present invention includes all these embodiments.

The electronic balance provided by the present invention is described above.

An influence of stress strain caused by machining conducted on the connecting portion of the mechanism part can be avoided when the size of the electronic balance in a transverse direction perpendicular to the longitudinal direction is extended without extending the size in the longitudinal direction. Therefore, even if a load is given being biased, it is possible to conduct an accurate measurement, and a compact electronic balance of high performance can be realized.

What is claimed is:

1. An electronic balance comprising:
    a balance pan for putting an article thereon;
    a movable part fixed to the balance pan; and
    a Roberval's mechanism for moving the movable part in parallel in the vertical direction;
    wherein the movable part, Roberval's mechanism, and each connecting part of the moveable part and Roberval's mechanism are formed into an integral construction, said integral construction having a first end and a second end, a length extending in a longitudinal direction between said first end and said second end, and a width extending transverse to the longitudinal direction, at least one of the first and second ends extending beyond said Roberval's mechanism in the length direction;

a lever mechanism for transmitting a displacement of the movable part to a load sensor;

a display device for displaying a weight of the article detected by the load sensor;

a base frame for fixing the integral construction; and, a protruding portion formed at said at least one of said first and second ends, said at least one of said first and second ends being one of a connecting portion, where the integral construction is fixed to the base frame and an attached portion, where the balance pan is secured to the integral construction, said protruding portion having a width dimension extending in the width direction, said protruding portion width dimension being larger than a width dimension of the Roberval's mechanism, wherein at least one of the balance pan and the base frame is connected to the integral construction of the protruding portion.

2. The electronic balance according to claim 1, wherein at least one of the balance pan and the base frame is connected at the protruding portion by at least one screw.

3. The electronic balance according to claim 1, wherein at least one of the balance pan and the base frame is connected at the protruding portion by adhesion.

4. The electronic balance according to claim 1, wherein at least one of the balance pan and the base frame is joined at the protruding portion by welding.

5. The electronic balance according to claim 1, wherein said protruding portion is provided by said movable part.

6. The electronic balance according to claim 1, wherein said balance pan is connected to the integral construction at the protruding portion, and further comprising a fitting that is secured to said movable part and extending between said movable part and said balance pan.

7. The electronic balance according to claim 6, wherein said movable part includes said protruding portion, and said fitting is secured to said protruding portion at a location laterally outboard of said Roberval's mechanism.

8. The electronic balance according to claim 7, wherein the balance pan is connected to the protruding portion by means selected from the group consisting of mechanical fasteners, adhesives, and welding.

9. The electronic balance according to claim 1, wherein said base frame is connected to said integral construction at the protruding portion at a location laterally outboard of said Roberval's mechanism.

10. The electronic balance according to claim 9, wherein the base frame is connected to the protruding portion by means selected from the group consisting of mechanical fasteners, adhesives, and welding.

11. The electronic balance according to claim 1, further comprising first and second protruding portions, said first protruding portion being provided at said connecting portion and having said base frame secured thereto, said second protruding portion being provided at said attached portion and having said balance pan secured thereto.

12. The electronic balance according to claim 11, further comprising a fitting that is secured to said movable part and extending between said movable part and said balance pan.

13. The electronic balance according to claim 12, wherein said movable part includes said second protruding portion, and said fitting is secured to said second protruding portion at a location laterally outboard of said Roberval's mechanism.

14. The electronic balance according to claim 13, wherein the base frame and the balance pan are connected to said first, and second protruding portions, respectively, by means selected from the group-consisting of mechanical fasteners, adhesives, and welding.

15. The electronic balance according to claim 11, wherein said base frame is secured to said-first protruding portion at a location laterally outboard said Roberval's mechanism.

* * * * *